United States Patent
Hay

(10) Patent No.: US 6,871,347 B2
(45) Date of Patent: Mar. 22, 2005

(54) METHOD AND APPARATUS FOR FACILITATING LOAD BALANCING ACROSS NAME SERVERS

(75) Inventor: Russell C. Hay, Kirkland, WA (US)

(73) Assignee: Interland, Inc., Minneapolis, MN (US)

( * ) Notice: Subject to any disclaimer, the term of this patent is extended or adjusted under 35 U.S.C. 154(b) by 782 days.

(21) Appl. No.: 09/835,312

(22) Filed: Apr. 13, 2001

(65) Prior Publication Data

US 2002/0152322 A1 Oct. 17, 2002

(51) Int. Cl.$^7$ ................................................. G06F 9/46
(52) U.S. Cl. ...................... 718/105; 709/203; 709/218; 709/219; 709/226; 709/235; 709/239; 714/4; 714/5; 714/11; 710/17
(58) Field of Search .......................... 709/203, 217–219, 709/226, 235, 238, 239, 245; 718/100, 105; 714/1–5, 10, 11; 710/15–19

(56) References Cited

U.S. PATENT DOCUMENTS

| | | | | |
|---|---|---|---|---|
| 5,687,309 | A | * | 11/1997 | Chen .............................. 714/4 |
| 6,249,801 | B1 | * | 6/2001 | Zisapel et al. .............. 718/105 |
| 6,330,605 | B1 | * | 12/2001 | Christensen et al. ........ 709/226 |
| 6,351,775 | B1 | * | 2/2002 | Yu .............................. 709/238 |
| 6,725,253 | B1 | * | 4/2004 | Okano et al. ................ 709/203 |
| 6,735,631 | B1 | * | 5/2004 | Oehrke et al. .............. 709/226 |
| 2001/0038633 | A1 | * | 11/2001 | Robertson et al. | |
| 2001/0049741 | A1 | * | 12/2001 | Skene et al. | |
| 2002/0120743 | A1 | * | 8/2002 | Shabtay et al. | |

OTHER PUBLICATIONS

Publication, entitled "DNS: The Domain Name System," http://www.rad.com/networks/1995/dns/dns.htm, pp. 1–8.

* cited by examiner

Primary Examiner—Anthony Knight
Assistant Examiner—Crystal J Barnes
(74) Attorney, Agent, or Firm—Park, Vaughan & Fleming, LLP

(57) ABSTRACT

One embodiment of the present invention provides a system that translates host names into Internet Protocol (IP) addresses. This system includes a plurality of name servers that are configured to translate host names into corresponding IP addresses. This system also includes a plurality of load balancers coupled to the plurality of name servers. Each of these load balancers is configured to receive requests for host name translations, and to distribute these requests between the plurality of name servers in order to balance load across the plurality of name servers. Note that these load balancers are configured to operate in parallel in distributing requests between the plurality of name servers. A variation on the above embodiment provides a system that performs failovers between a plurality of load balancers that are configured to balance requests for host name to IP address translations between a plurality of name servers. The system operates by sending a keep alive packet from a load balancer to a first neighboring load balancer, and then waiting for a response to the keep alive packet in order to determine if the first neighboring load balancer remains alive. If the first neighboring load balancer does not remain alive, the load balancer takes over servicing of translation requests directed to the first neighboring load balancer.

20 Claims, 4 Drawing Sheets

METHOD AND APPARATUS FOR FACILITATING LOAD BALANCING ACROSS NAME SERVERS

BACKGROUND

1. Field of the Invention

The present invention relates to translating addresses for communications across computer networks. More specifically, the present invention relates to a method and an apparatus for providing multiple load balancers to balance translation requests across multiple name servers.

2. Related Art

As the Internet continues to grow at an exponential rate, the existing Internet infrastructure must continually expand to keep pace with increasing network traffic. One problem in this expansion is to ensure that mechanisms that translate host names into Internet Protocol (IP) addresses continue to operate in the face of an increasing volume of translation requests.

Note in order to send a message across a network, it is necessary to include the destination address in the message. This destination address is typically a 32-bit number, which is referred to as an IP address.

However, 32-bit IP addresses tends to be hard for a human being to remember. For this reason, the domain name system (DNS) is used to provide more easily remembered logical names, which are referred to as "host names". By referring to a host through a host name, a network user does not have to remember the IP address which specifies the physical location of the host. Moreover, the host may be moved to a different network while users continue to use the same logical host name.

The domain name system operates through use of a database that contains translations between logical host names and IP addresses. This database is distributed between a plurality of name servers. In sending a message to a host, a translation between the logical host name and the IP address typically takes place at a name server, which contains records of host name to IP address translations.

As network traffic continues to increase, name servers are beginning to experience a tremendous volume of requests. In order to service these requests, some systems have begun to employ multiple name servers that operate in parallel. In this type of system, address translation requests are typically received by a centralized load balancer that distributes the requests to the multiple name servers.

However, as the number of requests for address translations continues to increase, a single load balancer is often not able to keep pace with the large volume requests that are directed to the multiple name servers. Moreover, if the load balancer fails or must be stopped for routine maintenance, no address translations can take place because the load balancer is unavailable to route address translation requests.

What is needed is a method and an apparatus for routing address translation requests without the performance and reliability problems associated with existing systems that use a single load balancer.

SUMMARY

One embodiment of the present invention provides a system that translates host names into Internet Protocol (IP) addresses. This system includes a plurality of name servers that are configured to translate host names into corresponding IP addresses. This system also includes a plurality of load balancers coupled to the plurality of name servers. Each of these load balancers is configured to receive requests for host name translations, and to distribute these requests between the plurality of name servers in order to balance load across the plurality of name servers. Note that these load balancers are configured to operate in parallel in distributing requests between the plurality of name servers.

In one embodiment of the present invention, each of the load balancers is associated with its own IP address, and is configured to process translation requests directed to its own IP address.

In one embodiment of the present invention, each of the load balancers is configured to take over load balancing operations for one or more failed load balancers.

In one embodiment of the present invention, the load balancers are organized into a ring. Within this ring, each load balancer is configured to take over load balancing operations for a neighboring load balancer, if the neighboring load balancer fails.

In one embodiment of the present invention, each load balancer is a proxy server that is configured to accept user datagram protocol (UDP) and transmission control protocol (TCP) connections from domain name system (DNS) clients, and to forward corresponding UDP or proxy TCP requests to the plurality of name servers.

In one embodiment of the present invention, each of the plurality of load balancers is configured to distribute translation requests between the plurality of name servers based upon measured response times of the plurality of name servers.

In one embodiment of the present invention, the system includes an internal communication network that couples the plurality of load balancers with the plurality of name servers.

One embodiment of the present invention provides a system that translates a host name into an Internet Protocol (IP) address. Upon receiving a translation request to translate the host name into the IP address, the system selects a name server to process the translation request. This selection is based upon a measured load of the name servers. This ensures that overloaded name servers will not be selected. Next, the system forwards the translation request to the selected name server, so that the selected name server can translate the host name into the IP address.

In one embodiment of the present invention, the system additionally measures a load on the name servers by periodically sending an information request to each name server, and measuring a response time for the request.

One embodiment of the present invention provides a system that performs failovers between a plurality of load balancers that are configured to balance requests for host name to IP address translations between a plurality of name servers. The system operates by sending a keep alive packet from a load balancer to a first neighboring load balancer, and then waiting for a response to the keep alive packet in order to determine if the first neighboring load balancer remains alive. If the first neighboring load balancer does not remain alive, the load balancer takes over servicing of translation requests directed to the first neighboring load balancer.

In one embodiment of the present invention, the system receives a second keep alive packet from a second neighboring load balancer, and sends a response to the second keep alive packet to the second neighboring load balancer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
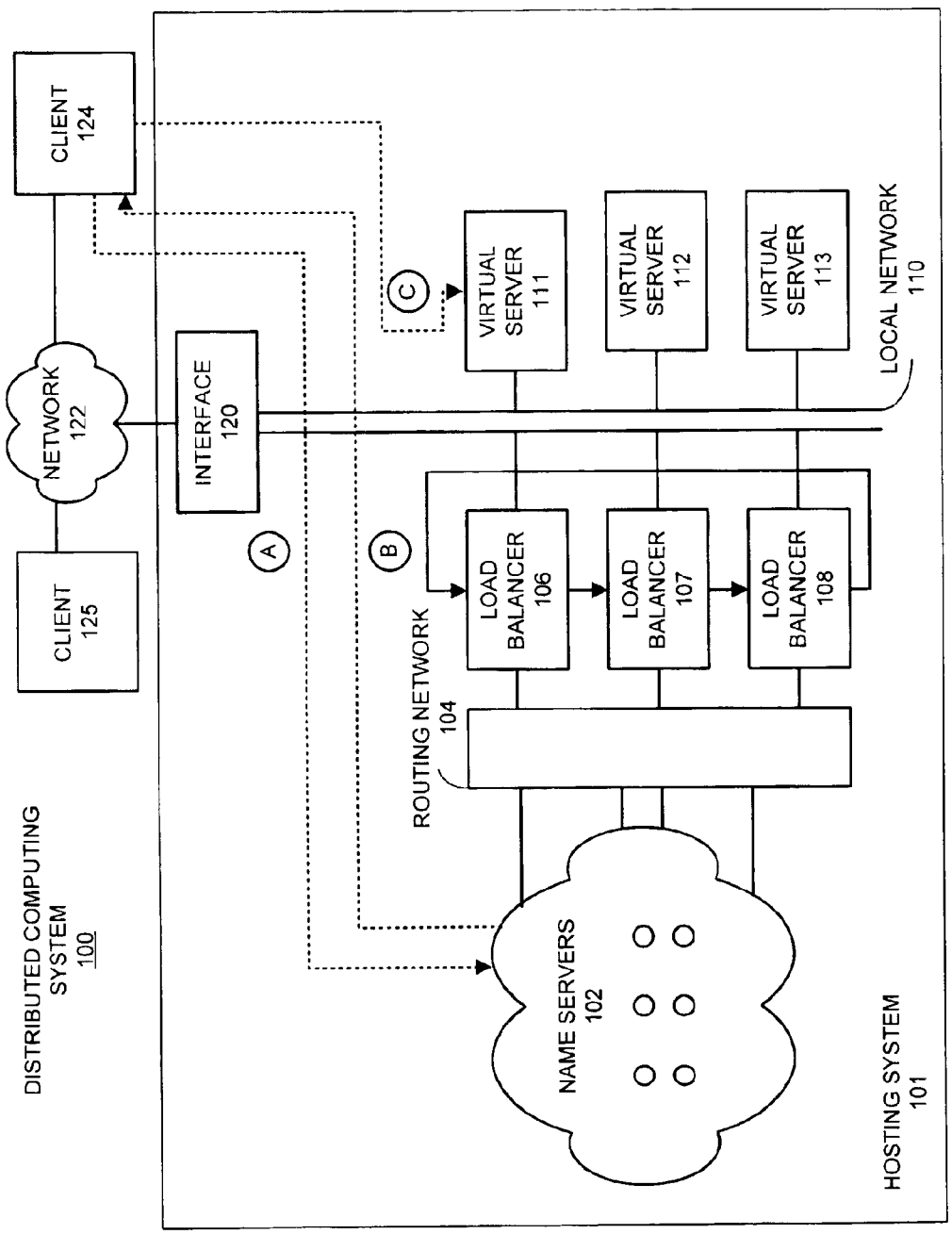
FIG. 1 illustrates a distributed computing system in accordance with an embodiment of the present invention.

FIG. 1 illustrates a distributed computing system 100 in accordance with an embodiment of the present invention. Distributed computing system 100 includes clients 124–125, which are coupled through network 122 to hosting system 101.

Network 122 can generally include any type of wire or wireless communication channel capable of coupling together computing nodes. This includes, but is not limited to, a local area network, a wide area network, or a combination of networks. In one embodiment of the present invention, network 122 includes the Internet.

Clients 124–125 can generally include any node on a network including computational capability and including a mechanism for communicating across the network.

Hosting system 101 makes a number of applications available to clients 124–125 across network 122. In order to do so, hosting system 101 includes a local network 110 that is coupled to network 122 through interface 120. In one embodiment of the present invention, local network 110 includes a 1-gigabit local area network.

Local network 110 is coupled to virtual servers 111–113, which host applications that can be accessed by clients 124–125. Note that each virtual server 111–113 operates within its own virtual environment on a physical server. This allows multiple virtual servers to be located on the same physical server without interfering with each other.

Local network 110 is additionally coupled to a number of name servers 102 through load balancers 106–108. In one embodiment of the present invention, name servers 102 are configured to service requests to translate host names into IP addresses for hosts that are associated with virtual servers 111–113. In order to process these requests, load balancers 106–108 receive the requests and route them through routing network 104 to name servers 102. Name servers 102 are selected to receive requests based upon measured response times. This ensures that name servers that are heavily loaded are not selected to receive additional requests.

In one embodiment of the present invention, each load balancer 106–108 is accessed through its own IP address, and this IP address is different from the IP address of the other name servers. Note that for return communications from name servers 102 to clients 124–125, the source address for the return communication is configured to be the IP address of the load balancer that originally forwarded the request. This makes the return communication appear to originate from the IP address of the load balancer that originally forwarded to request.

In one embodiment of the present invention, the load balancers 106–108 are organized into a ring and are configured so that if one or more of the load balancers 106–108 fail, neighboring load balancers in the ring can take over for the failed load balancer.

The name servers 102 illustrated in FIG. 1 operate generally as follows. A client 124 sending a message to a virtual server 111 first obtains the IP address of the virtual server 111. This is accomplished by sending a host name for the virtual server 111 through load balancers 106–108 to one of name servers 102 (A). Recall that the name server is selected based upon load. Next, the selected name server translates the host name into a corresponding IP address and returns the IP address to client 124 (B). Finally, client 124 uses the IP address to communicate directly with virtual server 111 (C).

Process of Forwarding a Translation Request

Figure 2:
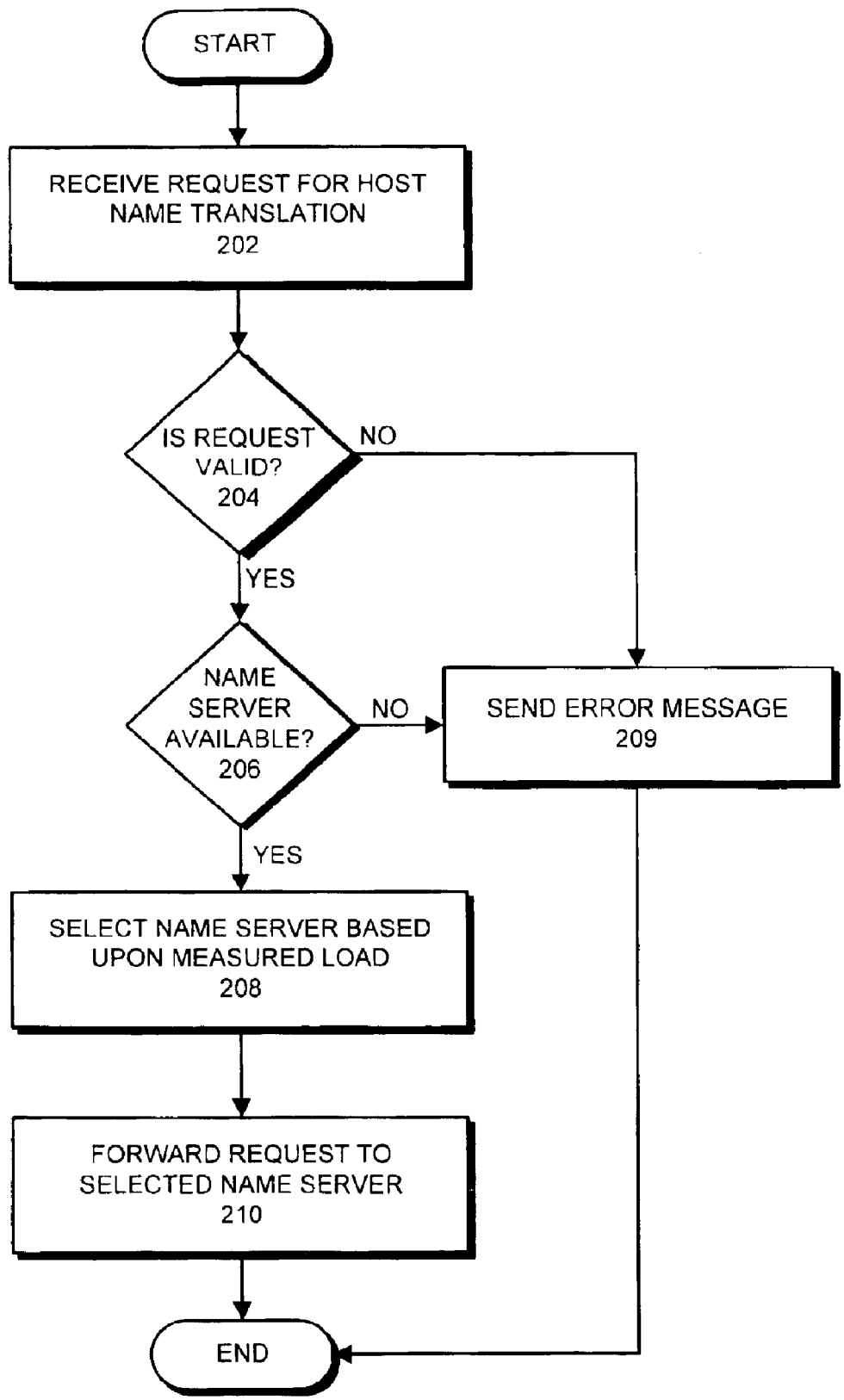
FIG. 2 is a flow chart illustrating the process of forwarding an address translation request from a load balancer to a name server in accordance with an embodiment of the present invention.

FIG. 2 is a flow chart illustrating the process of forwarding a request from a load balancer to a name server in accordance with an embodiment of the present invention. A load balancer 106 first receives a request for a host name translation from a client 124 (box 202). Next, load balancer 106 uses a set of rules to determine if the request is valid (box 204). If not, the system generates an error message (box 209). Otherwise, if the request is valid, the system determines whether a name server is available to process the request (box 206). This may involve measuring response times for name servers 102 as is described in more detail below with reference to FIG. 3. If no name servers are available, the system generates an error message (box 209). Otherwise, if at least one name server is available, the system selects one of the available name servers based upon measured response times (box 208). This is done to ensure that a highly loaded name server is not selected if a lightly loaded name server is available. Load balancer 106 then forwards the request to the selected name server (box 210).

Process of Measuring Name Server Response Times

Figure 3:
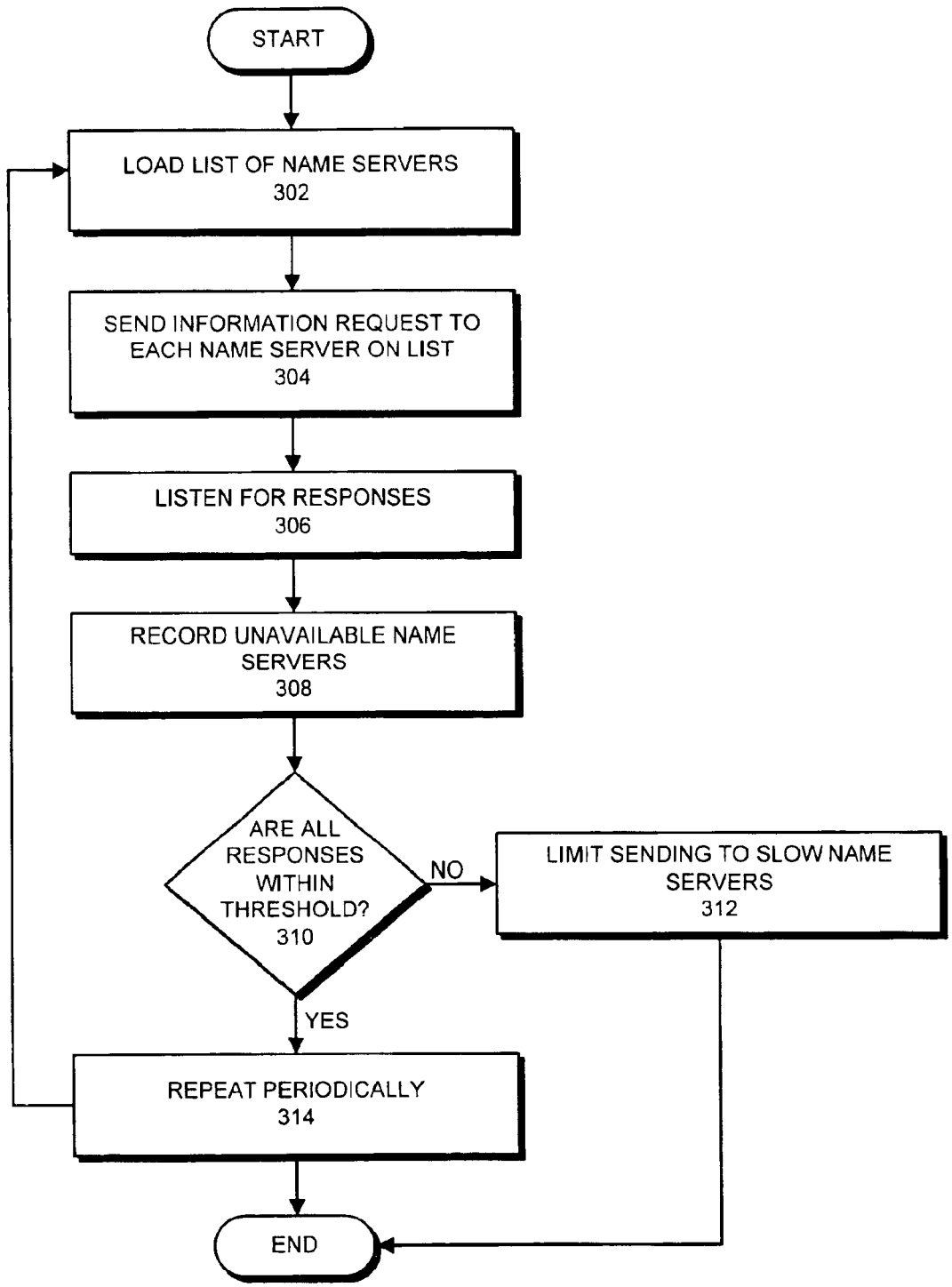
FIG. 3 is a flow chart illustrating the process of measuring response times for name servers in accordance with an embodiment of the present invention.

FIG. 3 is a flow chart illustrating the process of measuring response times for name servers in accordance with an embodiment of the present invention. In order to measure response times, a load balancer 106 first loads a list of name servers from a database or other storage area (box 302). Load balancer 106 then sends an information request to each name server on the list (box 304). Next, load balancer 106 listens for responses and measures response times for each of the name servers on the list (box 306). Load balancer 106 next makes a record to indicate that any name server that did not respond is unavailable (box 308). Load balancer 106 also determines whether all remaining name servers responded within a threshold time period (box 310). If any of the name servers did not respond within the threshold time period, they are considered to be overloaded, and the load balancer 106 limits the sending of additional requests to these overloaded name servers (box 312). Note that this threshold time is selected to ensure a reasonable response time. Also note that load balancer 106 periodically repeats the above process in order to keep track of the load on name servers 102 (box 314).

Process of Monitoring and Taking Over for a Neighboring Load Balancer

Figure 4:
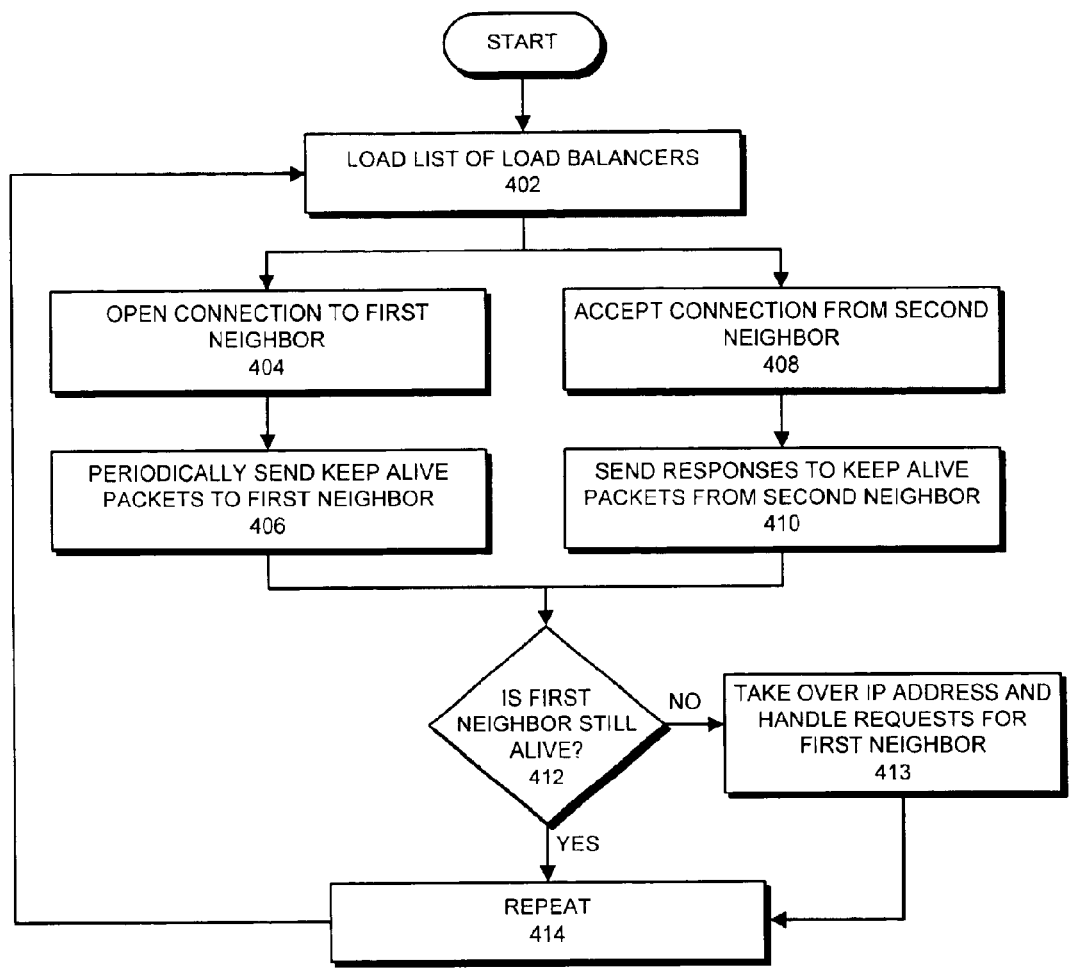
FIG. 4 is a flow chart illustrating the process of monitoring a neighboring load balancer and taking over for the neighboring load balancer if the neighboring load balancer fails in accordance with an embodiment of the present invention.

FIG. 4 is a flow chart illustrating the process of monitoring a neighboring load balancer and taking over if the neighboring load balancer fails in accordance with an embodiment of the present invention. Each of the load balancers 106–108 continually performs the below-described process.

This process starts when a load balancer 106 loads a list of all of the load balancers in the system 106–108 (box 402). Recall that in the embodiment of the present invention illustrated in FIG. 1, these load balancers are organized into a ring. Next, load balancer 106 opens a connection to a first neighboring load balancer in the ring, for example to load balancer 107 (box 404), and then sends keep alive packets to load balancer 107 (box 406). By listening for responses to these keep alive packets, load balancer 106 can determine whether load balancer 107 remains alive.

At the same time, load balancer 106 accepts a connection from a second neighboring load balancer in the ring (box 408), for example from load balancer 108. Next, load balancer 106 sends responses to any keep alive packets received from load balancer 108 (box 410). In this way, load balancer 106 continually notifies load balancer 108 that load balancer 106 remains alive.

If load balancer 106 determines that load balancer 107 is alive because responses to keep alive packets sent to load balancer 107 have been received (box 412), the system repeats the process (box 414). Otherwise, if no responses to the keep alive packets are received from load balancer 107, load balancer 106 determines that load balancer 107 is not alive. In this case, load balancer 106 takes over the IP address for load balancer 107, and handles all subsequent requests that are directed to load balancer 107 (box 413).

Note that if another adjacent load balancer fails, such as load balancer 108, load balancer 106 takes over for load balancer 108 in a subsequent iteration through the loop.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that translates host names into Internet Protocol (IP) addresses, comprising:
   a plurality of name servers, wherein each name server is configured to translate a host name into a corresponding IP address; and
   a plurality of load balancers coupled to the plurality of name servers, wherein each load balancer is configured to,
   receive requests for host name translations at a load balancer, and to
   distribute the requests between the plurality of name servers so as to balance load across the plurality of name servers;
   wherein load balancers in the plurality of load balancers are organized into a ring;
   wherein each load balancer is configured to take over load balancing operations for a neighboring load balancer in the ring, if the neighboring load balancer fails; and
   wherein the plurality of load balancers are configured to operate in parallel in distributing requests between the plurality of name servers.

2. The apparatus of claim 1, wherein each of the plurality of load balancers is associated with its own IP address, and is configured to process translation requests directed to its own IP address.

3. The apparatus of claim 1, wherein each of the plurality of load balancers is configured to take over load balancing operations for one or more failed load balancers in the plurality of load balancers.

4. The apparatus of claim 1, further comprising an internal communication network that couples the plurality of load balancers with the plurality of name servers.

5. The apparatus of claim 1, wherein each load balancer in the plurality of load balancers is a proxy server that is configured to accept user datagram protocol (UDP) and transmission control protocol (TCP) connections from domain name system (DNS) clients, and to forward corresponding UDP or proxy TCP requests to the plurality of name servers.

6. The apparatus of claim 1, wherein each of the plurality of load balancers is configured to distribute translation requests between the plurality of name servers based upon measured response times of the plurality of name servers.

7. A method for translating a host name into an Internet Protocol (IP) address, comprising:
   receiving a translation request at a load balancer within a plurality of load balancers to translate the host name into the IP address;
   wherein the plurality of load balancers are organized into a ring; and
   wherein each load balancer is configured to take over load balancing operations for a neighboring load balancer in the ring, if the neighboring load balancer fails;
   selecting a name server from a plurality of name servers to process the translation request based upon a measured load of the plurality of name servers, so that overloaded name servers will not be selected; and
   forwarding the translation request to the selected name server so that the selected name server can translate the host name into the IP address.

8. The method of claim 7, further comprising measuring a load on the plurality of name servers by periodically:
   sending an information request to each name server in the plurality of name servers; and
   measuring a response time to the information request for each name server in the plurality of name servers.

9. The method of claim 7, wherein receiving the translation request involves receiving the translation request at one of a plurality of load balancers, wherein each load balancer is configured to:
   receive translation requests for host name translations; and to
   distribute the translation requests between the plurality of name servers so as to balance load across the plurality of name servers.

10. The method of claim 9, wherein each of the plurality of load balancers is associated with its own IP address, and is configured to process translation requests directed to its own IP address.

11. The method of claim 9, further comprising taking over load balancing operations, if necessary, for one or more failed load balancers in the plurality of load balancers.

12. The method of claim 9, wherein each load balancer in the plurality of load balancers is a proxy server that is configured to accept user datagram protocol (UDP) and transmission control protocol (TCP) connections from domain name system (DNS) clients, and to forward corresponding UDP or proxy TCP requests to the plurality of name servers.

13. A method for performing failovers between a plurality of load balancers that are configured to balance requests for host name to IP address translations between a plurality of name servers that are coupled to the plurality of load balancers, comprising:
   sending a keep alive packet to a first neighboring load balancer in the plurality of load balancers;
   wherein the plurality of load balancers are organized into a ring; and
   wherein each load balancer in the plurality of load balancers is configured to take over load balancing operations for a neighboring load balancer in the ring, if the neighboring load balancer fails;
   waiting for a response to the keep alive packet in order to determine if the first neighboring load balancer remains alive;
   if the first neighboring load balancer does not remain alive, taking over servicing of translation requests directed to the first neighboring load balancer.

14. The method of claim 13, further comprising distributing translation requests between the plurality of name servers based upon measured response times of the plurality of name servers.

15. The method of claim 13, wherein each load balancer in the plurality of load balancers is a proxy server that is configured to accept user datagram protocol (UDP) and transmission control protocol (TCP) connections from domain name system (DNS) clients, and to forward corresponding UDP or proxy TCP requests to the plurality of name servers.

16. The method of claim 13, further comprising:
   receiving a second keep alive packet from a second neighboring load balancer in the plurality of load balancers; and
   sending a response to the second keep alive packet to the second neighboring load balancer.

17. The method of claim 15, wherein each of the plurality of load balancers is associated with its own IP address, and is configured to process translation requests directed its own IP address.

18. An apparatus that translates host names into Internet Protocol (IP) addresses, comprising:
   a plurality of name servers, wherein each name server is configured to translate a host name into a corresponding IP address; and
   a plurality of load balancers coupled to the plurality of name servers, wherein each load balancer is configured to,
      receive requests for host name translations at a load balancer, and to
      distribute the requests between the plurality of name servers so as to balance load across the plurality of name servers;
   wherein the plurality of load balancers are configured to operate in parallel in distributing requests between the plurality of name servers;
   wherein the plurality of load balancers are organized into a ring;
   wherein each of the plurality of load balancers is configured to take over load balancing operations for one or more failed load balancers in the plurality of load balancers; and
   wherein each of the plurality of load balancers is configured to distribute translation requests between the plurality of name servers based upon measured response times of the plurality of name servers.

19. A method for translating a host name into an Internet Protocol (IP) address, comprising:
   receiving a translation request at one of a plurality of load balancers to translate the host name into the IP address;
   selecting a name server from a plurality of name servers to process the translation request based upon a measured load of the plurality of name servers, so that overloaded name servers will not be selected;
   forwarding the translation request to the selected name server from the load balancer so that the selected name server can translate the host name into the IP address; and
   taking over load balancing operations, if necessary, for one or more failed load balancers in the plurality of load balancers;
   wherein the plurality of load balancers are organized into a ring;
   wherein each load balancer is configured to distribute the translation requests between the plurality of name servers so as to balance load across the plurality of name servers.

20. A method for performing failovers between a plurality of load balancers that are configured to balance requests for host name to IP address translations between a plurality of name servers that are coupled to the plurality of load balancers, comprising:
   distributing translation requests between the plurality of name servers based upon measured response times of the plurality of name servers;
   sending a keep alive packet to a first neighboring load balancer in the plurality of load balancers;
   wherein the plurality of load balancers are organized into a ring; and
   wherein each load balancer in the plurality of load balancers is configured to take over load balancing operations for a neighboring load balancer in the ring, if the neighboring load balancer fails;
   waiting for a response to the keep alive packet in order to determine if first neighboring load balancer remains alive;
   if the first neighboring load balancer does not remain alive, taking over servicing of translation requests directed to the first neighboring load balancer;
   receiving a second keep alive packet from a second neighboring load balancer in the plurality of load balancers; and
   sending a response to the second keep alive packet to the second neighboring load balancer.

* * * * *